(12) United States Patent
Onderko et al.

(10) Patent No.: US 7,612,673 B2
(45) Date of Patent: Nov. 3, 2009

(54) RFID SYSTEM FOR LIFTING DEVICES

(75) Inventors: John C. Onderko, Appleton, WI (US);
Shawn J. Sullivan, Neenah, WI (US);
Sudhanshu Gakhar, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 330 days.

(21) Appl. No.: 11/755,121

(22) Filed: May 30, 2007

(65) Prior Publication Data

US 2008/0297348 A1  Dec. 4, 2008

(51) Int. Cl.
G08B 13/14 (2006.01)
(52) U.S. Cl. ............... 340/572.1; 340/572.8; 700/215; 700/217; 235/383; 235/384; 235/385
(58) Field of Classification Search ............... 340/527.1, 340/527.8; 700/215, 217; 235/383, 384, 235/385
See application file for complete search history.

(56) References Cited

U.S. PATENT DOCUMENTS

| | | | |
|---|---|---|---|
| 6,669,089 | B2 | 12/2003 | Cybulski et al. |
| 7,121,457 | B2 | 10/2006 | Michal, III |
| 7,151,979 | B2 | 12/2006 | Andersen et al. |
| 7,155,304 | B1 | 12/2006 | Charych |
| 2005/0170784 | A1 | 8/2005 | Ariyoshi |
| 2005/0200457 | A1 | 9/2005 | Bridgelall et al. |
| 2006/0255948 | A1 | 11/2006 | Runyon et al. |
| 2006/0255951 | A1 | 11/2006 | Roeder et al. |
| 2006/0255954 | A1 | 11/2006 | Sorenson, Jr. et al. |
| 2006/0287759 | A1 | 12/2006 | Charych |

FOREIGN PATENT DOCUMENTS

| | | |
|---|---|---|
| EP | 1 710 204 A2 | 10/2006 |
| WO | WO 03/042916 | 5/2003 |
| WO | WO 2006/070460 | 7/2006 |
| WO | WO 2006/070463 | 7/2006 |
| WO | WO 2006/124399 | 11/2006 |
| WO | WO 2006/124433 | 11/2006 |
| WO | WO 2006/124761 | 11/2006 |

OTHER PUBLICATIONS

EPO Search Report, Jul. 23, 2008.

*Primary Examiner*—Benjamin C. Lee
*Assistant Examiner*—Ojiako Nwugo
(74) *Attorney, Agent, or Firm*—Dority & Manning, P.A.

(57) ABSTRACT

A lifting device equipped with an RFID scanning system having an article receiving area configured for receipt of a stack of articles having RFID tags associated therewith. A first scanning antenna is provided at a first height relative to the article receiving area, and a second scanning antenna is provided at a second height relative to the article receiving area that is above the first height. A computer control system is in communication with the first and second scanning antennas and applies a verification parameter to RFID signals received by the second scanning antenna to determine whether RFID tagged articles detected by the second scanning antenna are within the stack of articles carried by the lifting device.

13 Claims, 5 Drawing Sheets

RFID SYSTEM FOR LIFTING DEVICES

TECHNICAL FIELD OF THE INVENTION

The present invention relates generally to the field of radio frequency identification (RFID) tags, and more particularly to a system for improved handling and tracking of items with lifting devices such as clamp trucks, forklifts, and the like.

BACKGROUND

Radio Frequency Identification (RFID) devices are low-cost, "smart" chips or "tags" that can be embedded in or attached to articles, products, and the like, to convey information about the product via a scanner. The RFID tags are generally small label-like devices with a microchip or data circuit and a miniature embedded antenna. The tags may be passive or active, the active tags requiring an internal power supply. A reader or scanner interrogates the RFID tag with an electronic "trigger" signal. The tag in turn generates an electromagnetic pulse response that is readable by the scanner, the response containing any manner of product information. From a manufacturing or material handling standpoint, RFID tags can be embedded directly in raw material packaging, on pallets or shelves, at various warehouse locations, and so forth, to convey any manner of information related to materials, storage locations, production schedules and uses, and the like.

Implementation of RFID systems with material handling equipment such as forklifts, clamp trucks, lift trucks or hoists, and the like, offers advantages in various aspects of manufacturing, from inventory control to improved production efficiencies. Various patent publications describe the use of RFID systems with such equipment, including: U.S. Pat. Nos. 7,155,304; 7,121,457; 7,151,979; 6,669,089; US Pat. Appln. Pub. 2006/0255948; US Pat. Appln. Pub. 2006/0255954; US Pat. Appln. Pub. 2006/0255951; US Pat. Appln. Pub. 2005/0200457; and US Pat. Appln. Pub. 2006/0287759. These cited patents and applications pertain to various configurations of RFID devices on conventional lifting devices to address particular perceived shortcomings, or to improve material handling.

Many facilities typically handle relatively tall stacks of light materials or products with conventional lifting devices in the course of product manufacture, packaging, transport, and so on. These materials or products may be, for example, cartons of bulky consumer goods or large rolls of pre-formed absorbent raw material (referred to collectively as "articles"). The height of such articles, stacked or individually packaged, may significantly exceed the effective height of the clamp region between the clamps of a conventional clamp truck, or the back support of the carriage assembly of a conventional forklift. In this situation, use of RFID antennas on or around the clamps and back support of the lifting device may result in miss-reads of articles at the top of the stack due to the relatively limited range of the RFID tag antennas, or interference from the products or pallets on the stack or surrounding the stack. Increasing the signal strength of the RFID antennas for tags associated with all of the articles so as to increase the effective interrogation range of the articles should the articles end up at or near the top of a stack is not a viable solution. Spurious detection of articles in nearby stacks or storage locations will likely occur, resulting in serious degradation of the handling system integrity and efficiency.

Simply placing RFID scanner antennas on the mast of the lifting device, or on other elevated structure, is also not acceptable. There is relatively limited space between the stationary and vertically moving components of conventional clamp trucks or forklifts to effectively accommodate the antennas. Also, additional support structure attached to the mast for attaching the scanner antenna may result in impairment of the operator's visibility. In addition, the mast does not move in the same manner as the clamps or carriage assembly and, after elevating the clamp or carriage, the mast antenna may actually be disposed below the clamps or carriage and thus be ineffective in reading RFID tags on articles in the elevated stack.

The lifting device RFID configurations discussed in the publications cited above fail to address the issues of moving or handling relatively tall stacks of articles with conventional lifting devices, and a need exists in the industry for a solution to these concerns. The present invention relates to such a solution.

SUMMARY

Objects and advantages of the invention will be set forth in the following description, or may be obvious from the description, or may be learned through practice of the invention.

The present invention provides a system and related method for accurately accounting for the presence of RFID tagged articles within a stack of articles that is carried by a lifting device. The term "lifting device" is used herein to encompass any manner of conventional clamp truck, forklift, lift truck or hoist, and any other type of mobile device used for handling or moving stacks of articles or material. It should also be appreciated that the term "article" is used herein to encompass any type or form of items that may be stacked, such as boxes, crates, rolls, bins, pallets, and so forth. The items may be finished goods, raw materials, or any other product.

In a particular embodiment, a lifting device is equipped with an RFID scanning system having first and second scanning antennas. The lifting device defines an article receiving area configured for receipt of a stack of RFID tagged articles. For example, the article receiving area may be defined by the volume of a vertically movable carriage assembly. The first scanning antenna is disposed at a first height relative to the article receiving area to detect articles within a lower portion of the stack, for example the articles carried within the carriage assembly. The second scanning antenna is disposed at a second height relative to the article receiving area above the first height so as to detect articles within an upper portion of the stack, for example those articles in the stack that extend above the carriage assembly. The second scanning antenna may be supported by any manner of support structure attached to the carriage assembly such that the antenna is disposed above the carriage assembly and moves therewith.

A computer control system is provided and is in communication with the first and second scanning antennas. It should be appreciated that this control system may include any combination of hardware and software, and may include components configured on the lifting device, as well as components remote from the lifting device. For example, components of the control system configured on the lifting device may be in wireless communication with remote, central components of an overall warehouse management system for any manner of data transfer between the components. The control system may operate with portable hand-held devices carried by warehouse personnel, such as portable RFID scanners. It should thus be understood that any manner of hardware and software implemented control system is within the scope and spirit of the invention.

An assumption is that the RFID signals received by the first lower scanning antenna are from valid interrogations the RFID tagged articles in the lower portion of the stack. These articles are generally within the confines or volume of the carriage assembly, and the first scanning antenna is positioned and calibrated so as to detect only articles within the carriage assembly. The likelihood of a spurious signal being received by the first scanning antenna from an RFID tag not within the stack is negligible. On the other hand, spurious signals from articles in other stacks or adjacent storage locations are more likely with respect to the second scanning antenna. The articles in the upper portion of the stack are not shielded by the carriage assembly, and the signal strength of the second scanning antenna may be set higher in order to expand the interrogation range to an anticipated height of the stack of articles to be moved or carried by the lifting device. The orientation of the second scanning antenna (i.e., to "look up") may also add to the likelihood of spurious signals from articles not within the stack.

To verify whether the signals received by the second scanning signal are from RFID tagged articles actually within the stack being carried by the lifting device, the control system applies a verification parameter to the signals received by the second scanning antenna as opposed to the first scanning antenna. This verification parameter may be any value or characteristic that can be used to essentially filter out spurious signals. For example, the verification parameter may be a minimum signal strength required to recognize the signal as a valid interrogation. In a particular embodiment, the verification parameter is a minimum read rate (number of signal reads per unit of time).

In a particular embodiment, the verification parameter is determined as a function of a signal characteristic from RFID tagged articles within the stack detected by the first scanning antenna. For example, the first scanning antenna may register a particular average read rate for the articles in the lower portion of the stack. The verification factor may then be determined as a function of this read rate, for example as a percentage of the read rate. This process may be carried out dynamically by the control system upon initialization of the RFID system.

In an alternative embodiment, the verification parameter may have been previously computed based on particular stack characteristics and stored in memory. Upon initialization of the RFID system, stack information is retrieved by the system, for example from a parent RFID tag associated with the stack, and the respective verification parameter is retrieved. A library of verification parameters for a vast array of stack configurations may be computed and stored in a library of a local or remote memory, for example in memory of the central warehouse management system. Upon detection of a particular stack by the lifting device, the central library may be queried for the proper verification parameter, which is transmitted and uploaded to the lifting device control system.

In still another embodiment, the verification parameter may be stored with the stack and retrieved by the control system upon initialization of the system. For example, a parent RFID tag may be supplied with the stack that contains any manner of information related to the stack or individual articles within the stack, such as SKU numbers, types of articles in the stack, and the like. This parent tag may also contain information related to operation of the RFID system, such as power settings for the first and second scanning antennas and a particular verification factor for the respective stack.

Reference is made below to particular embodiments within the scope of the invention, examples of which are illustrated in the drawings.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1A:
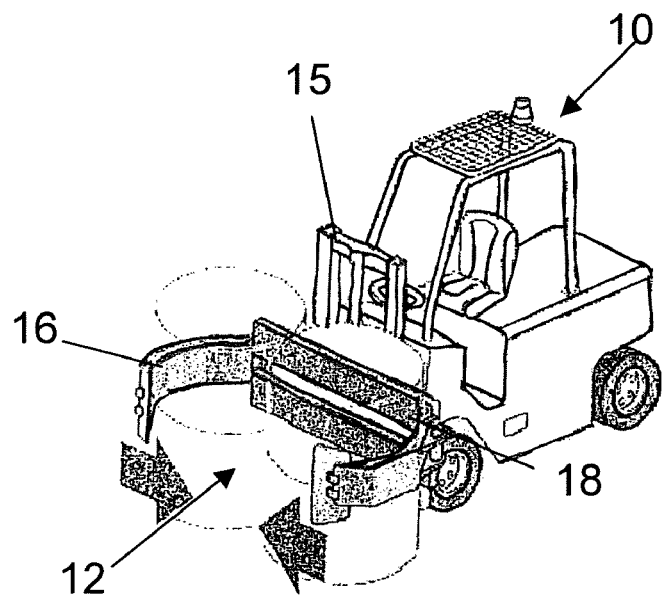
FIGS. 1A and 1B are perspective views of prior art lifting devices, particularly embodiments of clamp trucks.

Repeat use of reference characters throughout the present specification and appended drawings is intended to represent the same or analogous features or elements of the present technology.

DETAILED DESCRIPTION

Reference will now be made in detail to one or more embodiments of the invention, examples of which are graphically illustrated in the drawings. Each example and embodiment is provided by way of explanation of the invention, and not meant as a limitation of the invention. For example, features illustrated or described as part of one embodiment may be utilized with another embodiment to yield still a further embodiment. It is intended that the present invention include these and other modifications and variations.

RFID smart tag technology is known and understood by those skilled in the art, and a detailed explanation thereof is not necessary for purposes of describing the method and system according to the present invention. As discussed above, RFID or other smart tag technology is finding increasing uses in material handling and processing environments, particularly in warehouse or other storage facilities wherein articles are stored and moved in the process of converting raw materials to finished products. RFID tags containing any manner of information related to the articles may be attached directly to the articles, or associated with pallets, racks, bins, or any type of article packaging.

RFID tags of any known type may be used, including active RFID tags, passive RFID tags, and semi-passive RFID tags. Active RFID tags are battery-powered devices that transmit a signal to a reader and typically have long ranges such as 100 feet or more. Passive RFID tags are not battery powered but draw energy from electromagnetic waves from an RFID reader. Passive RFID tags often have a range of about 10 feet or less. Semi-passive RFID tags employ a battery to run the circuitry of a chip but rely on electromagnetic waves from a reader to power the transmitted signal.

Generally, passive smart tags consist of an integrated circuit, other semiconductors such as diodes, a coiled, etched, or stamped antenna, passive components such as resistors and capacitors, and a substrate on which the components are mounted or embedded. A protective covering is typically used to encapsulate and seal the substrate. Inductive or passive smart tags are commercially available from a number of vendors, including Motorola, and a detailed description of certain types of these devices may be found in U.S. Pat. No. 6,259,367 B1, incorporated herein by reference in its entirety for all purposes. Another commercial source of suitable smart tags is Alien Technology Corporation of Morgan Hill, Calif., under the technology name FSA (Fluidic Self-Assembly). With the FSA process, tiny semi-conductor devices are assembled into rolls of flexible plastic. The resulting "smart" substrate can be attached or embedded in a variety of surfaces. The smart tag technology under development at the Auto-ID Center at Massachusetts Institute of Technology (Cambridge, Mass.) can also be used within the scope of the present invention. Further information on smart tags and related technology is disclosed in U.S. Pat. No. 6,451,154, "RFID Manufacturing Concepts," issued Sep. 17, 2002 to Grabau et al.; U.S. Pat. No. 6,354,493, "System and Method for Finding a Specific RFID Tagged Article Located in a Plurality of RFID Tagged Articles," issued Mar. 12, 2002 to Mon; PCT publication WO 02/48955, published Jun. 20, 2002; U.S. Pat. No. 6,362,738, "Reader for Use in a Radio Frequency Identification System and Method," issued Mar. 26, 2002 to Vega; D. McFarlane, "Auto-ID Based Control," White Paper for the Auto-ID Centre Institute for Manufacturing, University of Cambridge, Cambridge, United Kingdom, Feb. 1, 2002, available at www.autoidcenter.org/research/CAM-AUTOID-WH-004.pdf; and Chien Yaw Wong, "Integration of Auto-ID Tagging System with Holonic Manufacturing Systems," White Paper for the Auto-ID Centre Institute for Manufacturing, University of Cambridge, Cambridge, United Kingdom, September 2001, available at www.autoidcenter.org/research/CAM-WH-001.pdf. Such references are hereby incorporated herein by reference in their entirety for all allowed purposes.

High frequency bands can be used in RFID technology, such as bands between 300 MHz and 10 GHz. SCS Corporation (Rancho Bernardo, Calif.), for example, markets smart tag technology at 2.45 GHz. Ultra-wide band technology can also be adapted for RFID systems.

Exemplary RFID tag manufacturers include Matrics, Alien Technology, Philips Semiconductor, and Texas Instruments. Manufacturing may be done by robotic techniques (e.g., "flip-chip"/"pick and place" techniques), fluidic self-assembly (FSA), the Philips "I-connect" method or the Philips "vibratory assembly" method, or other known processes. Exemplary RFID reader manufacturers include Intemec Technologies, Symbol Technologies, Matrics, AWID (e.g., their multi-protocol reader operate at various frequencies), and others. Software systems to support RFID systems are provided by IBM Global Services (which has acquired PriceWaterhouseCoopers), Texas Instruments, Manhattan Associates (particularly for integrated supply chain executions), SAP, and others. Printed RFID labels may be made using equipment from Zebra Technologies and other vendors.

RFID tags include an antenna that may be made by any known method, including metal deposition, printing of conductive inks, etc. By way of example, the RFID tags may employ conductive ink technology of RCD Technologies (Bethlehem, Pa.). Antennae may be printed using any known format, and may, for example, comprise double-sided, interconnected coils. Any known frequency may be used, such as 100 kHz or 125 kHz ("low frequency"), 13.56 MHz ("high frequency"), 860 930 MHz such as 900 MHz or 915 MHz ("ultra high frequency" or UHF), and 2.45 GHz or 5.8 GHz (microwave frequency), or other known frequencies. The type of antenna (i.e., inductive or capacitive) is generally a function of the operating range of the system.

The RFID system may follow the systems disclosed by the MIT Auto-ID Center, including the use of an electronic product code (EPC); an EPCIS system (Electronic Product Code Information Services from EPCglobal) to manage the codes being read with a distributed architecture and processes such as data smoothing, reader coordination, data forwarding, data storage, and task management; and Object Name Service (ONS) for matching EPC information to item information, typically using a domain name service (DNS) to route computers to Internet sites; and Physical Markup Language (PML) to describe information about a product.

Figure 1B:
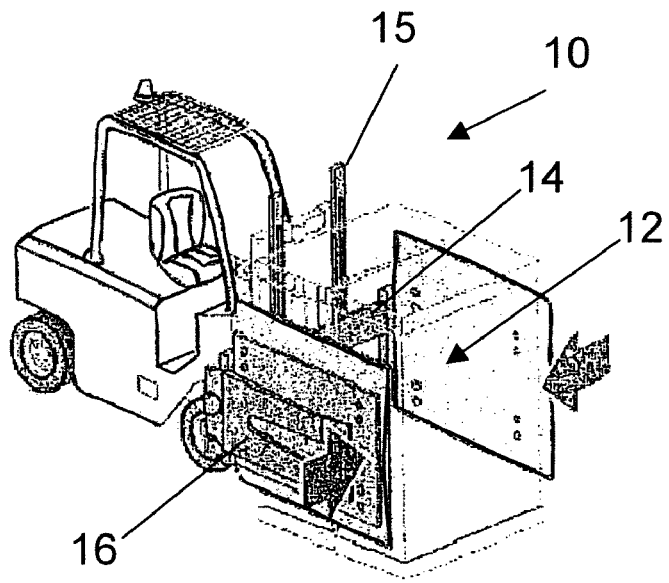
Figure 2:
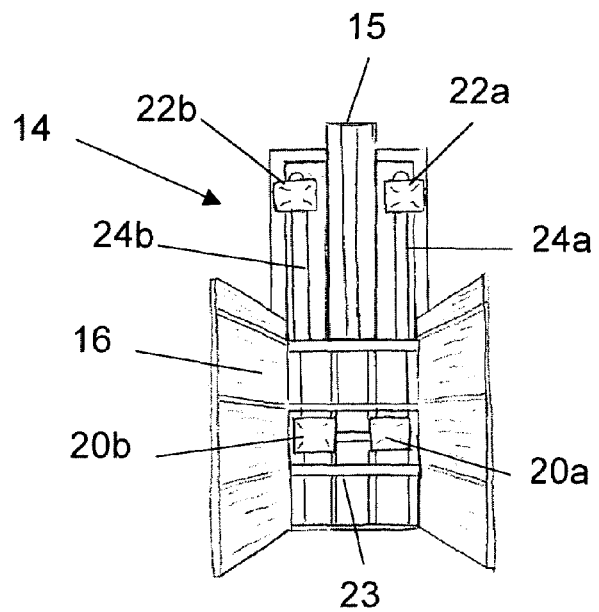
FIG. 2 is a front perspective view of the carrier assembly for a clamp truck configured with RFID scanning antennas in accordance with an embodiment of an the invention.

FIGS. 1A and 1B illustrate conventional embodiments of a lifting apparatus that may benefit from incorporation of the system and method according to the present invention. The lifting devices 10 illustrated in FIGS. 1A and 1B are examples of conventional clamp trucks, as commonly recognized by those skilled in the art. These clamp trucks typically utilize a motorized vehicle having a carriage assembly 14 configured thereon. The carriage assembly 14 includes clamp arms 16 that swing or move in the direction of the arrows in order to clamp any manner of articles therebetween. The carriage assembly 14 is typically movable in a vertical direction along a mast structure 15. The mast 15 may telescope in this regard. The carriage assembly 14 generally includes a back support 18 that may be defined by any manner of structure, including a ladder or lattice-like network of rigid members 23 (FIG. 2). In certain other examples, the back support structure 18 may include a generally solid wall, or the like. It should be appreciated that the present invention is not limited to any particular type of lifting apparatus, particularly the structure of the carriage assembly 14 and associated structure.

FIG. 2 is a front view of a carriage assembly 14 that incorporates first and second scanning antennas. Referring to the figure, a set of first scanning antennas 20a, 20b, are configured in the back support structure 18 of the carriage assembly 14. Although the use of a single lower antenna 20a is within the scope of the invention, it may be desirable to use two or more such antennas, such as illustrated in FIG. 2. The scanning antennas 20a, 20b, are the antenna components of a RFID scanning system, and serve to wake-up and interrogate RFID tagged articles 28 (FIGS. 3A and 3B) carried by the carriage assembly 14.

Figure 6:
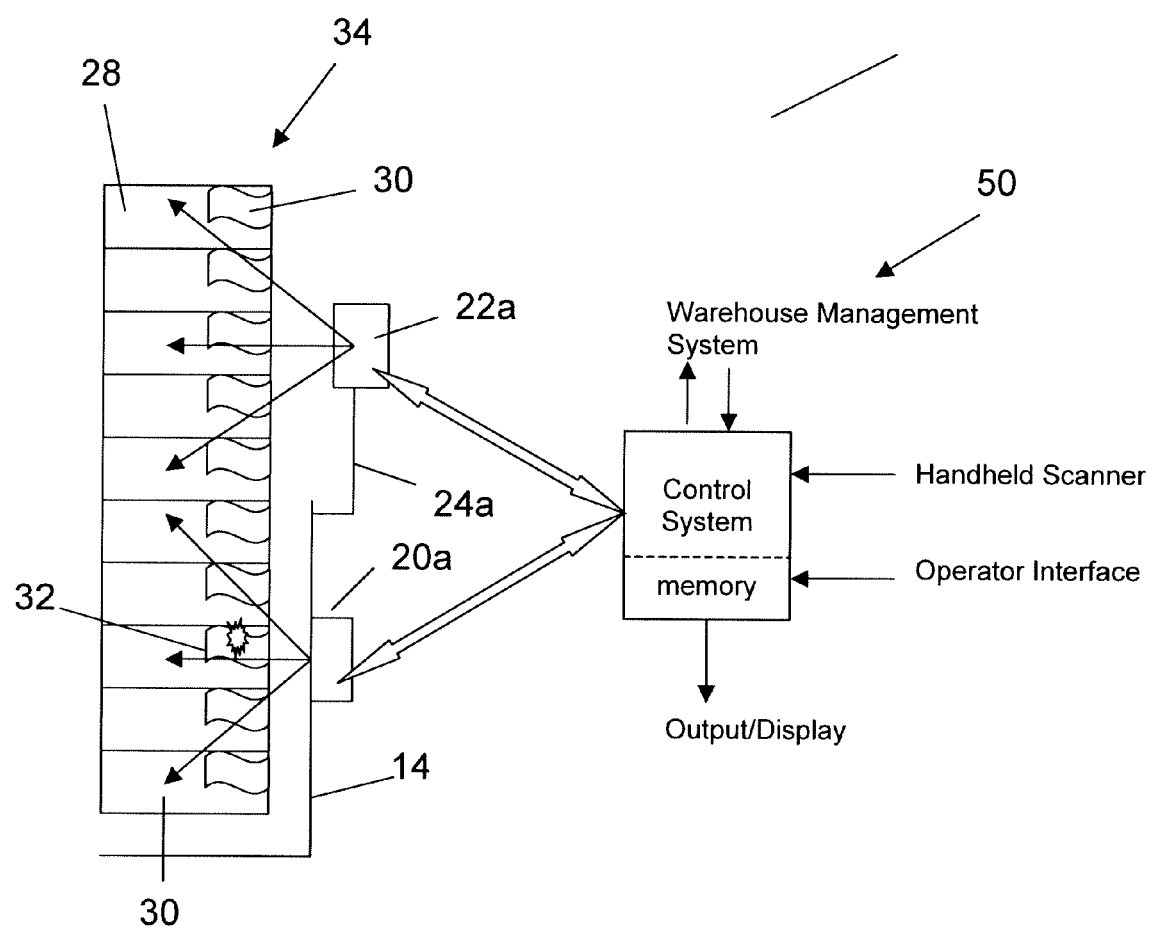
FIG. 6 is diagram view illustrating control features of an embodiment of the invention.

Referring to FIG. 6, the first scanning antennas 20A and 20B are configured to interrogate the RFID tagged articles 28 at a lower portion of a stack 34. The antenna power settings are set so that the range of the first scanning antennas 20A, 20B is generally only effective for articles 28 carried within the carriage assembly 14. By "carried within", it is meant to imply that the articles are disposed within the confines of the carriage assembly 14, for example between the clamp arms 16 and generally below the top level of the back support 18.

The first scanning antennas 20A, 20B, may be attached or otherwise configured on the back support structure 18 by any conventional attaching mechanism. Preferably, the antennas 20a, 20b are recessed within the back support structure 18, for example placed between adjacent support members 23, as illustrated in FIG. 2, or recessed within a cavity or well defined in the back support structure 18. This feature may be desired in order to protect the antennas from damage, and also so that the antennas do not interfere with loading of articles in the carriage assembly 14.

Still referring to FIG. 2, at least one second scanning antenna 22a, 22b, is configured with the carriage assembly 14 at a second height that is above the height of the first antennas 20a, 20b. Referring to FIG. 6, the second scanning antennas 22a, 22b are configured at a height and with parameter settings so as to detect the remaining upper portion of the articles 28 within the stack 34. The second scanning antennas 22a, 22b may be attached to any structure of the lifting device. Desirably, the antennas are attached to support structures 24a, 24b that extend from the carriage assembly 14 so that the second scanning antennas 22a, 22b move vertically with the carriage assembly and the relative height difference between the two sets of scanning antennas is maintained. Any manner of support structure 24b may be used to attach the second scanning antennas 22a, 22b. In the illustrated embodiments, the support structure 22b is a relatively thin, elongated U-shaped support attached to the back support structure 18 of the carriage assembly 14. The supports 24a, 24b are disposed so as not to adversely interfere with the operator's field of view.

Figure 4:
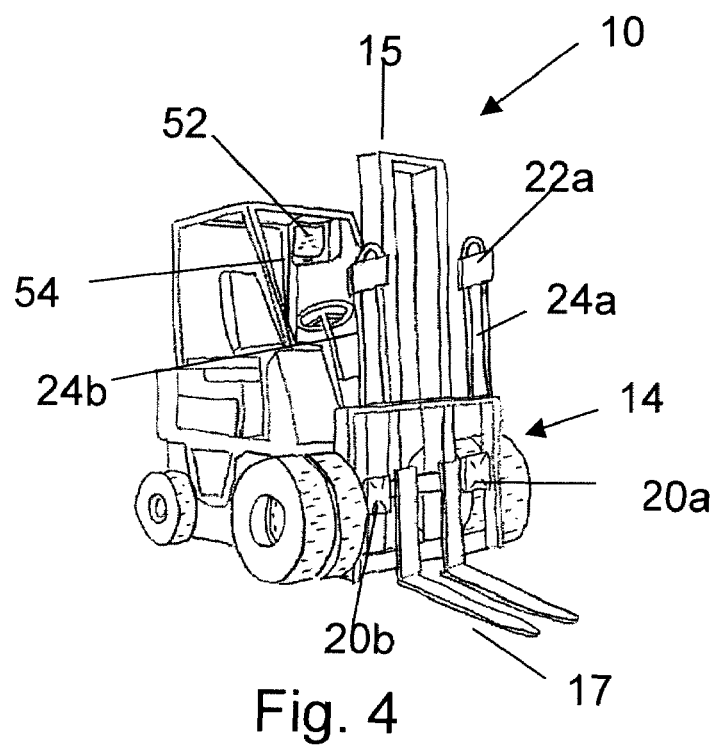
FIG. 4 is a perspective view of a forklift device configured with RFID scanning antennas in accordance with an embodiment of the invention.

FIG. 4 illustrates a forklift embodiment of a lifting apparatus 10 in accordance with the invention. The forklift device 10 includes a carriage assembly 14 having tines 17 configured thereon. The lower or first scanning antennas 20a, 20b are attached to the back support structure 18 and are desirably recessed below the back face of the tines 17. Second scanning antennas 22a, 22b are mounted with the U-shaped support structures 24a, 24b to the top of the carriage assembly 14. The carriage assembly 14 moves vertically relative to the mast 15. As discussed above, the mast 15 may include telescoping structure to increase the operating height of the carriage assembly 14. The lifting device 10 of FIG. 4 also includes components of the RFID control system within the cab of the lifting device. For example, a monitor 52 and operator interface 54 are provided within the cab.

Figure 5:
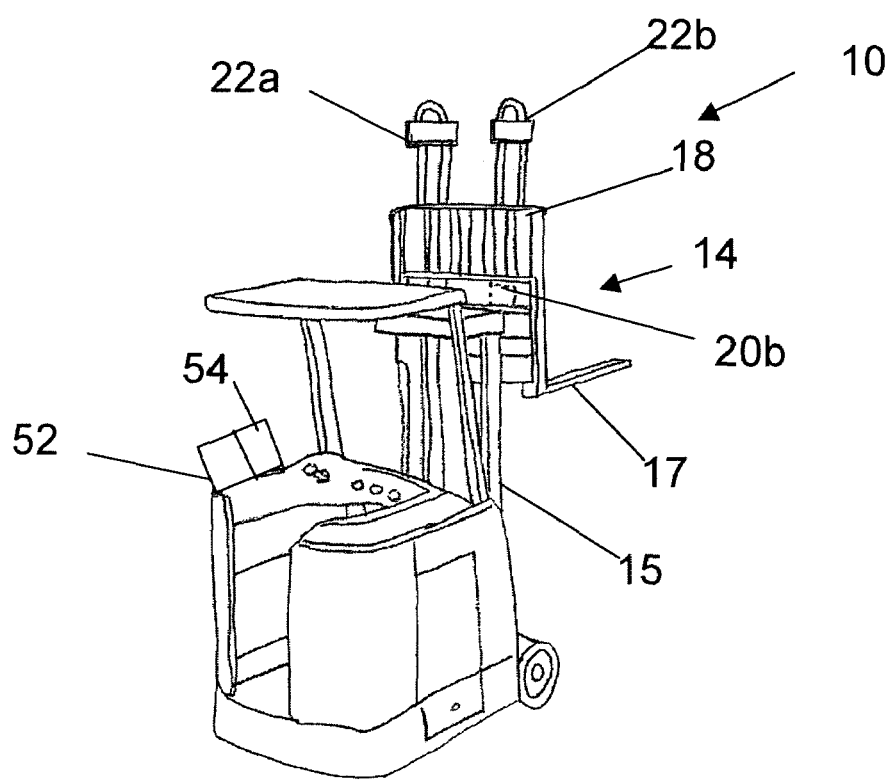
FIG. 5 is a perspective view of a lift truck or hoist device configured with RFID scanning antennas in accordance with an embodiment of the invention.

FIG. 5 illustrates yet another embodiment of a lifting device 10 incorporating the RFID system of the present invention. In this embodiment, the lifting device 10 is a lift truck (also referred to as a "hoist"). The lift truck 10 includes a carriage assembly 14 with tines 17. As with the embodiment of FIG. 4, the first scanning devices 20a, 20b are configured in the back support structure 18 of the carriage assembly 14. The second scanning antennas 22a, 22b are mounted by support structure 24a, 24b to the top of the carriage assembly 14. The carriage assembly 14 moves vertically relative to the mast 15.

Figures 3A, 3B:
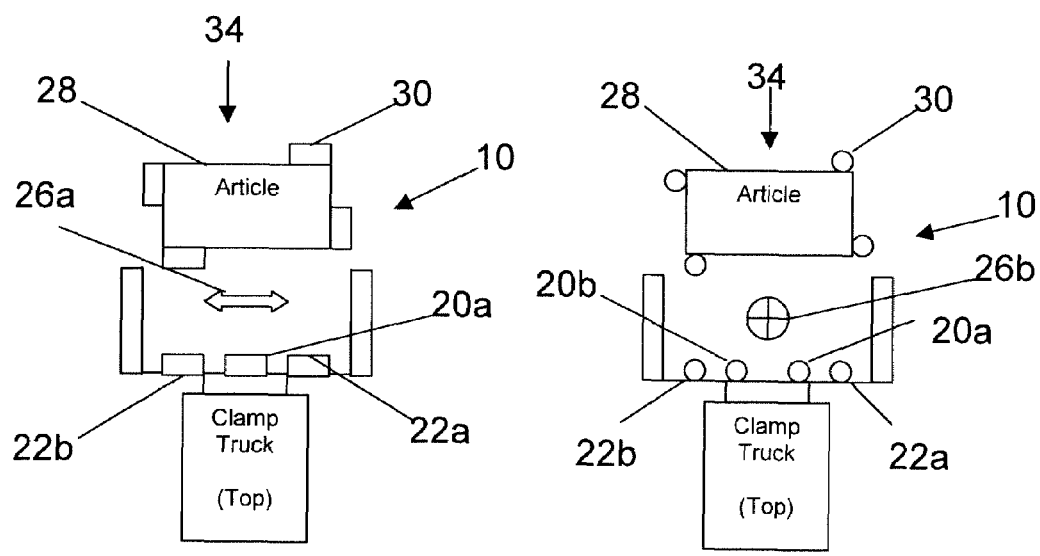
FIGS. 3A and 3B are diagrammatic top views of a clamp truck with associated antenna placement and orientation.

The diagram views of FIGS. 3A and 3B depict the top of a stack 34 of RFID tagged articles 28. Each article 28 has one or more RFID tags 30 attached thereto. In a desired configuration, RFID tags 30 are placed at respective corner edges of the article 28. This configuration ensures that at least one of the tags 30 will be interrogated and validated by a respective scanning antenna. The respective sets of scanning antennas may be oriented relative to the lifting device 10 so as to have a horizontal antenna axis 26a, as illustrated in FIG. 3A, or a vertical antenna axis 26b, as illustrated in FIG. 3B. The orientation of the antenna axis may be selected as a function of the type and height of the articles contained within the stack 34. A vertically oriented axis 26b may be desired for particularly tall stacks of articles.

FIG. 6 conceptually illustrates features of the RFID control system 50. The system 50 may contain any manner of hardware and software, and may include components configured on the lifting device 10, as illustrated in FIGS. 4 and 5, as well as components remote from the lifting device. For example, the control system 50 may include any combination of components remotely located with the warehouse management system. The control system may be in wireless communication with the warehouse management system for any manner of data transfer. The control system 50 may operate with portable handheld devices, such as a handheld RFID scanner, and also any manner of operator interface hardware, such as a keypad, or the like. The system 50 also desirably includes a means for outputting or otherwise displaying the results of the RFID scan of the articles 28 within the stack 34. This output may include a monitor 54 or other display within the lifting device 10, or remote from the device 10. The results are also preferably communicated to the remote warehouse management system for further processing, analysis, or storage.

As discussed above, the control system 50 applies a verification parameter to the RFID signals received by the second scanning antennas 22a, 22b to verify whether such signals are from RFID tagged articles 28 actually within the stack 34 being carried by the lifting device. This verification parameter may be any value or characteristic that can be used to essential filter out spurious signals detected by the second scanning antennas 22a, 22b. For example, the verification parameter may be a minimum signal strength required to recognize the RFID signal as a valid interrogation of an article 28 within the stack. In a desirable embodiment, the verification parameter may be a function of a minimum read rate (number of signal reads per unit of time) of the second scanning antennas 22a, 22b. If the read rate for a particular RFID tag is below a minimum read rate, the signal is considered a spurious signal and is not recognized as associated with a tagged article 28a within the stack 34.

Figure 7:
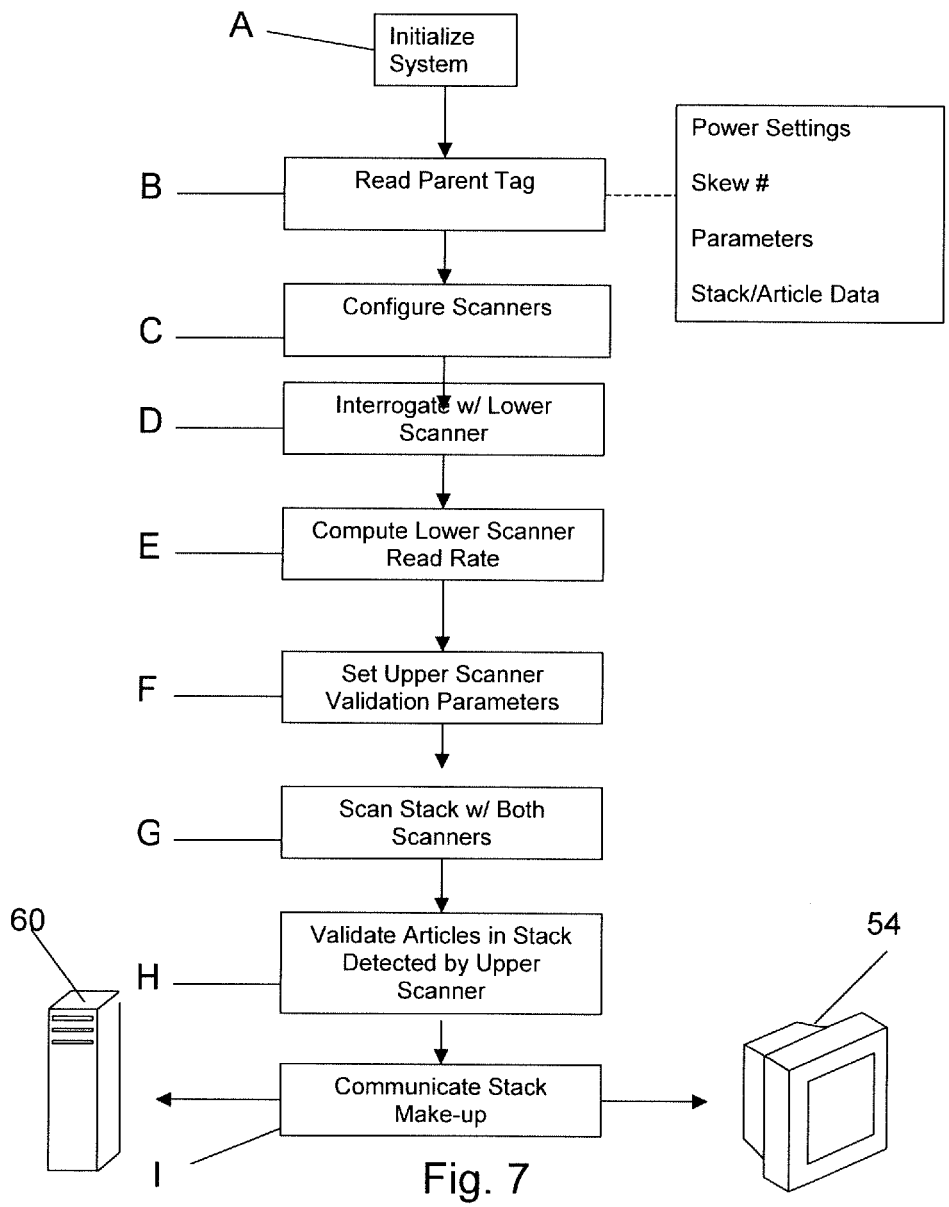
FIG. 7 is a flow diagram illustrating control features of an embodiment of the invention.

Referring to FIG. 7, a methodology embodiment for computing and applying the validation parameter is depicted. In step A, the RFID system is initialized, which may include generation of a wake-up signal for RFID tags within the detection range of the respective scanning antennas. In step B, a parent RFID tag 32 (FIG. 6) within the stack 34 may be interrogated for retrieval of any manner of information relative to the stack 34, or articles 28 within the stack. This data may include, for example, power settings for the respective scanning antennas, SKU numbers for the articles within the stack, any manner of operating parameters for the RFID system, and any other manner of stack/article data. Data retrieved from the parent tag may be used to configure the first and second scanners in step C. In step D, the lower portion of the RFID tagged articles 28 within the stack 34 are interrogated with the first scanning antennas 20a, 20b. In step E, the results of the scan in step D are used to compute an average read rate for the articles scanned by the first scanners 20a, 20b. Based on this average read rate, a validation parameter is computed. For example, the validation parameter may be a minimum percentage of the average read rate for the lower RFID tagged articles 28, or some other function of the average read rate for the lower articles. The validation parameter is accepted as a control parameter within the system prior to interrogation of the upper portion of the articles 28 with the second scanning antennas 22a, 22b in step G. The lower articles may also be scanned in step G. In step H, the validation parameter is used to set a minimum acceptance criteria for RFID signals received by the upper scanning antennas 22a, 22b to validate or confirm the actual RFID tagged articles within the stack 34. In step I, the results of the scan are communicated to the operator, for example via a monitor 54 within the lifting device 10, and to any other location, for example to a computer 60 that may be a component of a central warehouse management system.

The methodology of FIG. 7 relates to a dynamic method wherein the validation parameter is computed and applied for each RFID scanning operation. In other embodiments, the verification parameter may have been previously computed based on particular stack characteristics and stored in memory. For example, a library of such validation parameters may be stored in memory of the control system 50, or in a remote memory associated with the warehouse management system. The stored parameters are retrieved and utilized upon initialization of the RFID system. For example, referring to FIG. 7, this process may occur in steps A and B wherein retrieved stack/article data from the parent tag 30 is used to retrieve a previously computed and stored validation parameter.

In still an alternative embodiment, the verification parameter may be stored with the stack. For example, the validation parameter may be in the data stored on the parent RFID tag 30 and retrieved and implemented by the control system 50 upon initialization of the system.

It should be readily appreciated by those skilled in the art that various embodiments and methodology of the control system may be utilized for applying a verification parameter to signals received by the upper RFID scanning antennas in order to validate whether such signals are from RFID tagged articles within a stack of such articles carried by the lifting device. All such configurations of a control system are within the scope and spirit of the invention.

What is claimed is:

1. A lifting device equipped with an RFID scanning system, said device comprising:
    an article receiving area configured for receipt of a stack of articles having RFID tags associated therewith;
    a first scanning antenna at a first height relative to said article receiving area, and a second scanning antenna at a second height relative to said article receiving area above said first height;
    a computer control system in communication with said first and second scanning antennas, said control system applying a verification parameter to RFID signals received by said second scanning antenna as opposed to said first scanning antenna to determine whether RFID tagged articles detected by said second scanning antenna are within said stack of articles; and
    said verification parameter determined as a function of read rates of RFID signals detected by said first scanning antenna.

2. The lifting device as in claim 1, wherein said lifting device comprises any one of a forklift, clamp truck, or lift truck, and said article receiving area comprises a vertically movable carriage assembly, said first scanning antenna disposed on said carriage assembly so as to detect RFID tagged articles carried within said carriage assembly, and said second scanning antenna disposed on support structure above said carriage assembly so as to detect RFID tagged articles stacked above said carriage assembly.

3. The lifting device as in claim 2, wherein said first scanning antenna is attached to a back support of said carriage assembly, and said support structure for said second scanning antenna extends vertically upward from said back support and moves vertically with said carriage assembly.

4. The lifting device as in claim 1, wherein said first and second scanning antenna comprise vertically oriented respective antenna axis.

5. The lifting device as in claim 1, wherein said verification parameter is stored in memory in said control system and retrieved as a function of article or stack characteristics detected upon initialization of said control system.

6. The lifting device as in claim 1, wherein said verification parameter is supplied to said control system upon initialization of said control system.

7. The lifting device as in claim 6, wherein said verification parameter is read from a parent RFID tag associated with said stack of RFID tagged articles.

8. The lifting device as in claim 1, wherein said verification parameter is computed dynamically by said control system upon initialization of said control system from RFID tagged article signals detected by said first scanning antenna.

9. A lifting device equipped with an RFID scanning system, said device comprising:
    a vertically movable carriage assembly configured for receipt of a stack of RFID tagged articles;
    a first scanning antenna configured on said carriage assembly at a first height so as to detect RFID tagged articles within the stack carried within said carriage assembly;
    a second scanning antenna supported above said carriage assembly and vertically movable with said carriage assembly, said second scanning antenna disposed at a second height so as to detect RFID tagged articles within the stack that are at a height above said carriage assembly;
    a computer control system in communication with said first and second scanning antennas, said control system applying a verification parameter to RFID signals received by said second scanning antenna as opposed to said first scanning antenna to determine whether RFID tagged articles detected by said second scanning antenna are within said stack of articles, said verification parameter determined as a function of read rates of RFID signals detected by said first scanning antenna from RFID tagged articles within said carriage assembly.

10. A method for accounting for a stack of RFID tagged articles carried by a lifting device including any one of a clamp truck, forklift, or lift truck, said method comprising:
    scanning a lower portion of the articles within the stack with a first scanning antenna, and scanning an upper portion of the articles within the stack with a second scanning antenna disposed at a height above the first scanning antenna;
    applying a verification parameter to RFID signals received by the second scanning antenna as opposed to the first scanning antenna, the verification parameter establishing an acceptance criteria for determining whether RFID signals received by said second scanning antenna are from RFID tagged articles within the stack of articles; and
    said verification parameter determined as a function of read rates of RFID signals detected by said first scanning antenna.

11. The method as in claim 10, wherein the verification parameter is stored in memory in and retrieved as a function of detected article or stack characteristics.

12. The method as in claim 10, wherein the verification parameter is supplied from a parent RFID tag associated with the stack of RFID tagged articles.

13. The method as in claim 10, wherein the verification parameter is computed dynamically as a function of RFID tagged article signals detected by said first scanning antenna.

* * * * *